(12) United States Patent
Reyes

(10) Patent No.: US 11,351,496 B2
(45) Date of Patent: Jun. 7, 2022

(54) AIRBORNE PARTICULATE SUPPRESSION SYSTEM

(71) Applicant: DPFSource LLC, Morrison, CO (US)

(72) Inventor: Junior Reyes, Morrison, CO (US)

(73) Assignee: DPFSOURCE LLC, Morrison, CO (US)

( * ) Notice: Subject to any disclaimer, the term of this patent is extended or adjusted under 35 U.S.C. 154(b) by 0 days.

(21) Appl. No.: 17/247,971

(22) Filed: Jan. 4, 2021

(65) Prior Publication Data

US 2021/0205753 A1    Jul. 8, 2021

Related U.S. Application Data

(60) Provisional application No. 62/957,395, filed on Jan. 6, 2020.

(51) Int. Cl.
*B01D 47/06* (2006.01)
*B01F 23/21* (2022.01)
*F01N 3/023* (2006.01)
*F01N 3/035* (2006.01)
*B01D 46/681* (2022.01)
*B01F 23/213* (2022.01)

(52) U.S. Cl.
CPC ........... *B01D 47/06* (2013.01); *B01D 46/681* (2022.01); *B01F 23/2132* (2022.01); *F01N 3/0237* (2013.01); *F01N 3/035* (2013.01); *B01D 2279/30* (2013.01)

(58) Field of Classification Search
CPC ..... B01D 47/06; B01F 23/213; B01F 23/2132
See application file for complete search history.

(56) References Cited

U.S. PATENT DOCUMENTS 1,992,762 A * 2/1935 Pease ................... B01D 47/085
95/219

* cited by examiner

*Primary Examiner* — Robert A Hopkins
(74) *Attorney, Agent, or Firm* — Trenner Law Firm, LLC; Mark D. Trenner

(57) ABSTRACT

An airborne particulate suppression system is disclosed as it may be implemented for cleaning diesel particulate filter (DPF) devices. In an example, the airborne particulate suppression system includes a containment area having an air inlet to receive air containing soot and an air outlet to exhaust air cleaned of the soot. The airborne particulate suppression system includes a supply basin for a scrubbing agent. The airborne particulate suppression system also includes a coil having a plurality of spray nozzles to spray the scrubbing agent into the containment area. A pump provides the scrubbing agent to the coil at a pumping rate configured to spray the scrubbing agent from the plurality of spray nozzles and onto the air with soot to clean the air of the soot.

20 Claims, 5 Drawing Sheets

US 11,351,496 B2

AIRBORNE PARTICULATE SUPPRESSION SYSTEM

PRIORITY CLAIM

This application claims the priority benefit of U.S. Provisional Patent Application No. 62/957,395 filed Jan. 6, 2020 titled "Airborne Particulate Suppression System" of Junior Reyes, hereby incorporated by reference for all that is disclosed therein as though fully set forth herein.

BACKGROUND

Diesel particulate filter (DPF) devices are implemented in diesel engines to remove soot from the exhaust. While some filters are single-use (e.g., disposable), more commonly, these filters are designed to regenerate during operation, either via a catalyst or fuel burner which heats the filter to combust the soot collected in the filters. Cleaning DPF devices is also required as part of periodic maintenance. DPF devices may also need to be cleaned outside of regular maintenance when contaminated (e.g., with fuel and/or oil). However, many cleaning techniques release soot from the DPF devices into the air, raising health concerns of those cleaning the filters and reducing the intended environmental benefit of reusing a DPF device.

DETAILED DESCRIPTION

An example airborne particulate suppression system is disclosed as it may be implemented for cleaning diesel particulate filter (DPF) devices, among other things. The example system may be implemented to capture air borne particulates during cleaning of the DPF devices, and keeps those particulates from entering the atmosphere. The example system may also be implemented to help keep HEPA filters (of a dust collector used as part of a cleaning operation) cleaner for longer.

In an example, the airborne particulate suppression system includes a containment area having an air inlet to receive air containing soot and an air outlet to exhaust air cleaned of the soot. The example airborne particulate suppression system includes a supply basin for a scrubbing agent. The example airborne particulate suppression system also includes a coil having a plurality of spray nozzles to spray the scrubbing agent into the containment area. The example airborne particulate suppression system also includes a pump. During operation, the pump provides the scrubbing agent to the coil at a pumping rate configured to spray the scrubbing agent from the plurality of spray nozzles and onto the air with soot to clean the air of the soot. The scrubbing agent may be recycled and reused as part of a continuous cleaning process.

An example airborne particulate suppression system includes integrated spray nozzles. These nozzles may be configured to help contain soot and ash released from the DPF devices during cleaning operations. An example airborne particulate suppression system may spray a cleaning agent to assist in the capture of airborne particulates from dislodged soot, ash, and any other engine deposits (e.g., oil or fuel contamination), to keep these airborne particulates safely contained and out of the atmosphere during a cleaning process.

Before continuing, it is noted that as used herein, the terms "includes" and "including" mean, but is not limited to, "includes" or "including" and "includes at least" or "including at least." The term "based on" means "based on" and "based at least in part on."

It is also noted that the examples described herein are provided for purposes of illustration, and are not intended to be limiting. Other devices and/or device configurations may be utilized to carry out the operations described herein.

The operations shown and described herein are provided to illustrate example implementations. It is noted that the operations are not limited to the ordering shown. Still other operations may also be implemented.

FIG. 1 is a perspective view of an example airborne particulate suppression system 10 as it may be implemented to clean diesel particulate filter (DPF) devices. In this configuration, the airborne particulate suppression system 10 is shown connected between a blast cabinet 1 and a dust collector 2. In an example, the DPF device is cleaned in the blast cabinet 1. FIG. 2 is a cutaway side perspective view of an example blast cabinet 1 which may be implemented to clean diesel particulate filter (DPF) devices.

In an example, the blast cabinet 1 includes a work area 5 for cleaning a DFP device 6 therein, and a lid 7 that can be opened and closed. The lid 7 may include a transparent (e.g., glass or clear plastic) window so that the user can see into the work area 5. Gloves 8 may be provided through openings formed in the blast cabinet 1 for a user to reach into the work area 5 even when the lid 7 is closed to clean the DPF device 6. An air hose 9 is provided so that the user can spray air onto the DPF device 6 to loosen and remove soot and/or other contaminants from the DPF device 6. This causes the soot and/or other contaminants to become airborne. The air thus has to be contained and cleaned or "scrubbed" before releasing the air to the environment.

Air containing particulates may be exhausted from the blast cabinet 1 (e.g., via air line 3) and into the airborne particulate suppression system 10. The airborne particulate suppression system 10 may be operated to remove some or all of the particulates (e.g., soot) from the air. Air that has been cleaned by the airborne particulate suppression system 10 may be discharged from the airborne particulate suppression system 10 (e.g., via air line 4). In the example shown, the cleaned air is discharged to the dust collector 2 for further cleaning and/or purification. In another example, the cleaned air may be discharged to the environment.

FIG. 3 is a front perspective view of an example airborne particulate suppression system 10. FIG. 4 is a close up perspective view of an example airborne particulate suppression system 10. In an example, the airborne particulate suppression system 10 includes a containment area 12. The containment area 12 may be the interior space of a cabinet 13 or other substantially airtight housing. The cabinet 13 includes an air inlet 14 to receive air containing particulates (e.g., soot from the DPF device) in the containment area 12. In an example, a transparent cover (e.g., glass or plastic) may be provided so that a user can see into the containment area 12 and ensure proper operation.

Figure 1:
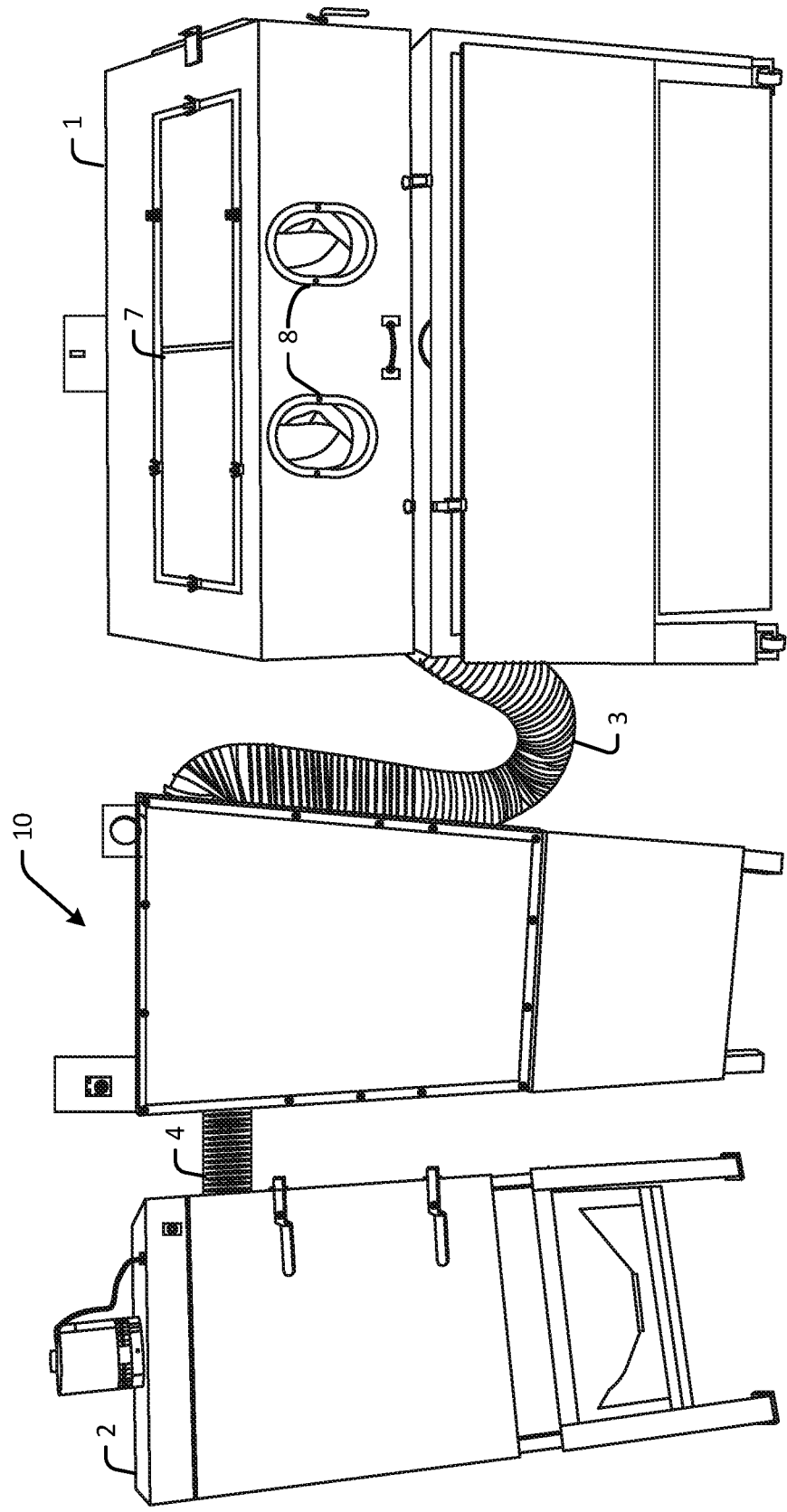
FIG. 1 is a perspective view of an example airborne particulate suppression system as it may be implemented to clean diesel particulate filter (DPF) devices.
Figure 2:
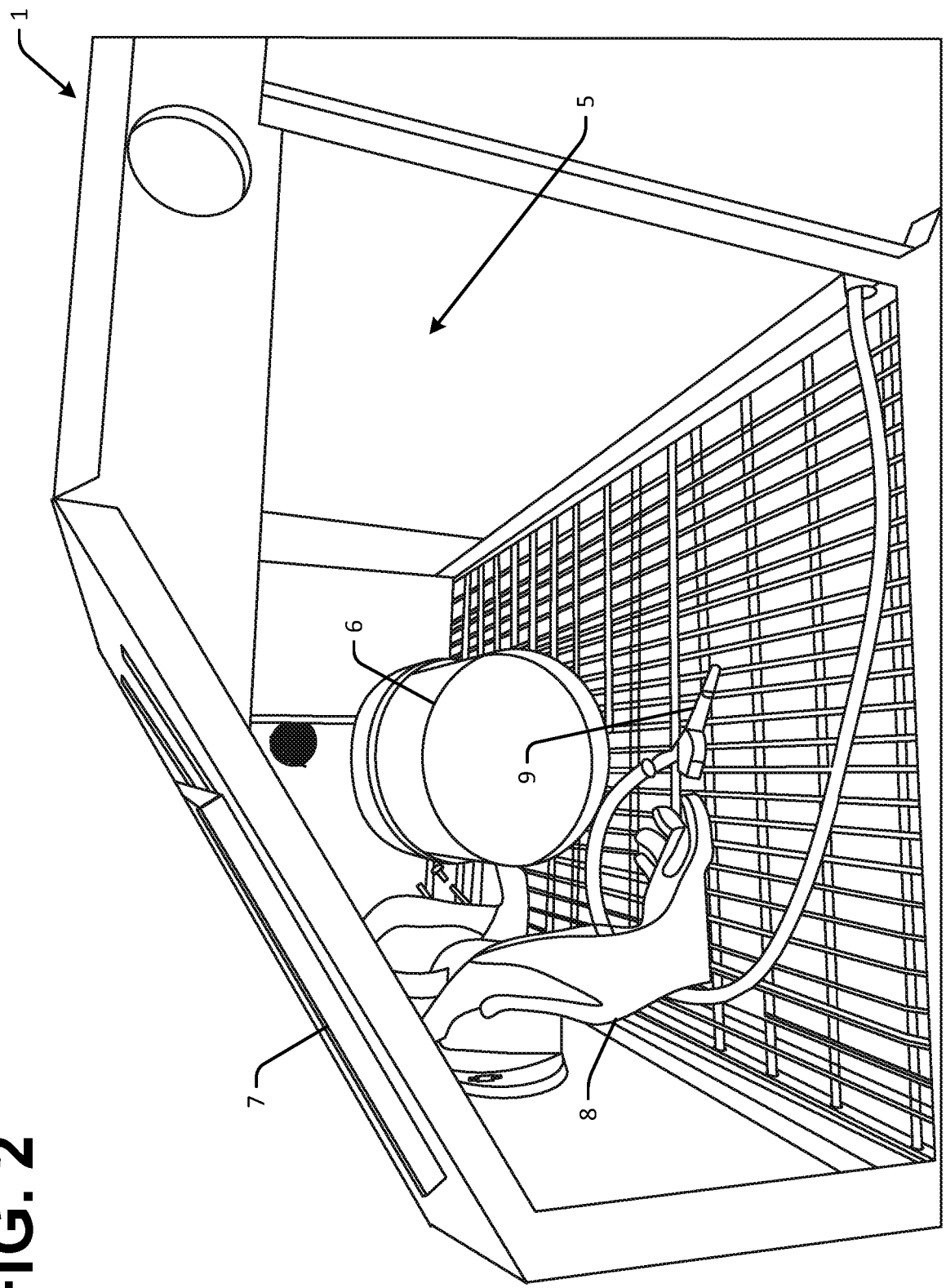
FIG. 2 is a cutaway side perspective view of an example blast cabinet which may be implemented to clean diesel particulate filter (DPF) devices.
Figure 3:
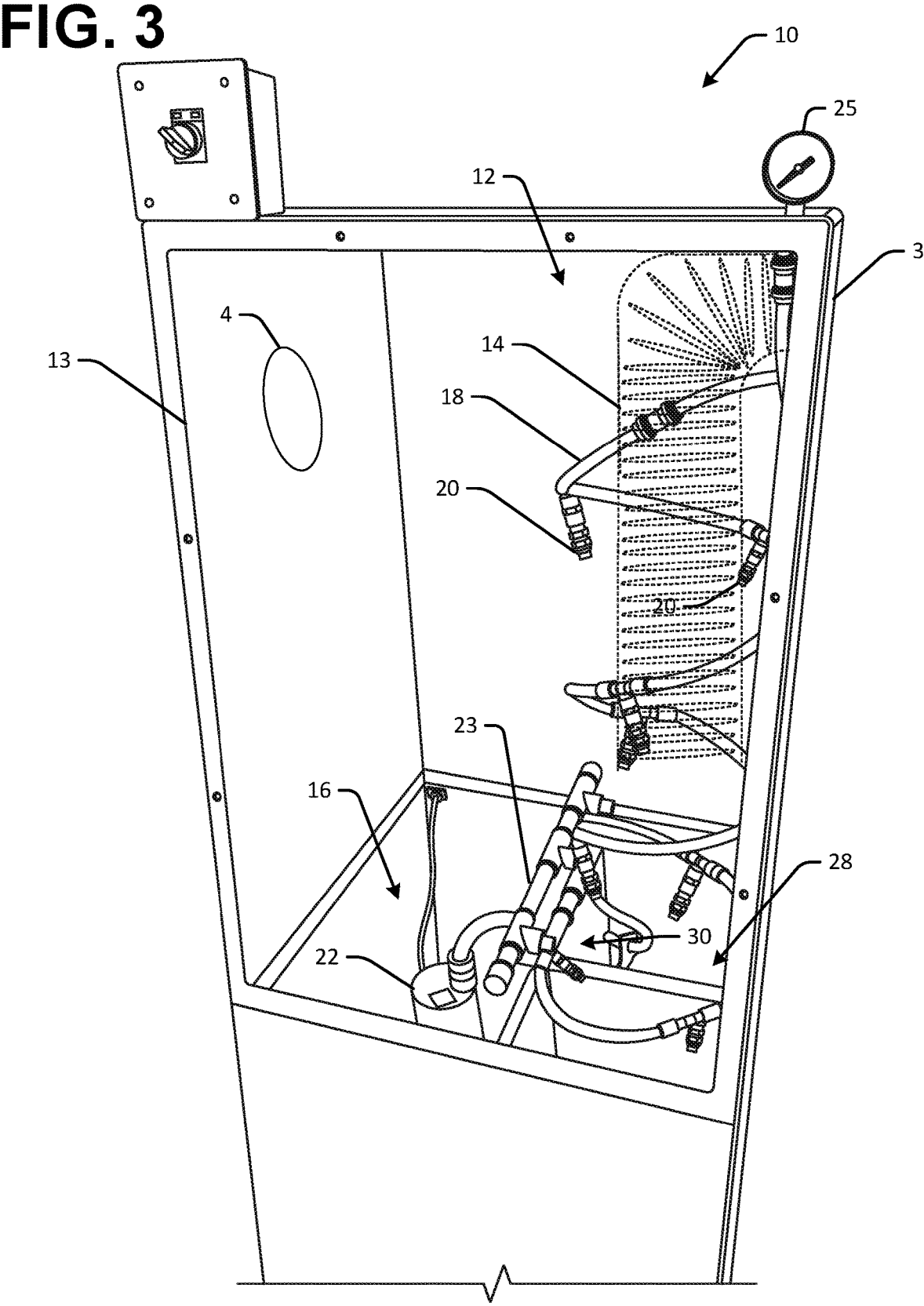
FIG. 3 is a front perspective view of an example airborne particulate suppression system.

In an example, the air inlet 14 includes an airflow supply line (e.g., a ducting or other inlet pipe(s)). The airflow supply line provides air containing the particular (e.g., airborne soot) into the containment area 12. In an example, the airflow supply line is provided through at least a portion of the coil 18. In FIG. 3, the airflow supply line is shown extending about half way through the coil 18 may extend lower (e.g., all the way to the bottom of the coil 18) or may terminate higher in the containment area 12 (e.g., at or near the top of the coil 18).

In the example shown in the drawings, the airflow supply line delivers the air containing soot in a downward direction. However, other orientations of the inlet air, the coil, the spray nozzles, etc. may be provided. Design considerations related to the orientation of the airflow and counter-current flow of the scrubbing agent may be implemented to enhance efficiency, as will be readily understood by those having ordinary skill in the art after becoming familiar with the teachings herein.

The cabinet 13 also provides a supply basin 16 for a scrubbing agent. The scrubbing agent may be a liquid (e.g., water, detergent, etc.). The scrubbing agent may also be a gas (e.g., air or inert gas). The scrubbing agent may also be a mixture of liquid and gas. In an example, the scrubbing agent is provided in a counter-current flow to the incoming air that is to be cleaned or "scrubbed." In an example, this is accomplished with a coil 18.

Figure 4:
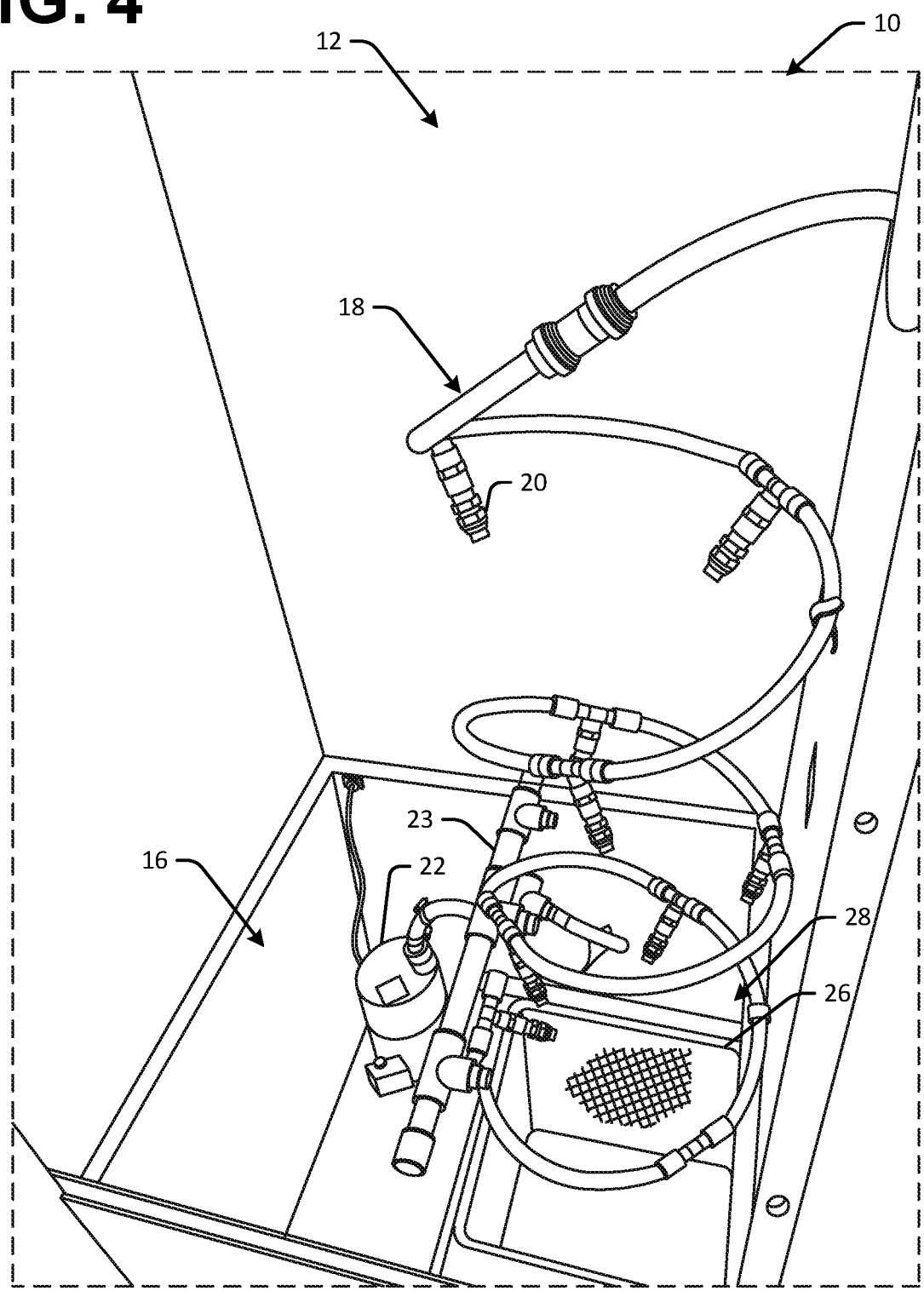
FIG. 4 is a close up perspective view of an example airborne particulate suppression system.

In an example, the coil 18 has at least one, and preferably a plurality of spray nozzles 20 configured to spray the scrubbing agent onto the air containing particulates in the containment area 12. For example, the plurality of spray nozzles 20 are shown in FIGS. 3 and 4 as these may be pointed toward or "aimed" around a central axis of the coil 18.

In an example, a pump 22 in the supply basin provides the scrubbing agent to the coil 18 at a pumping rate configured to spray the scrubbing agent from the spray nozzles 20 onto the air containing particulates in the containment area 12 to remove at least some of the particulates from the air. A manifold 23 may be connected between the pump 22 and the coil 18 to distribute flow of the scrubbing agent at the desired flow rate. A pressure gauge 25 may be provided (e.g., connected to the top end of the coil 18) to ensure the desired flow rate and/or spray pressure is being maintained during operation.

The cabinet 13 also provides a collection area. In an example, the collection area includes a collection bag 26. Although referred to herein as a "bag", the collection area may also be configured as a bin or other container for receiving the particulate (e.g., soot) that has been cleaned from the air.

In an example, the collection bag 26 is provided under the coil 18. Such a configuration enables the collection bag 26 to collect both spent scrubbing agent and particulate that has been removed from the air and/or is now contained in the scrubbing agent after the scrubbing agent is sprayed from the spray nozzles 20 of the coil 18.

In an example, the collection bag 26 is a screen or mesh to enable the scrubbing agent to pass out of the collection bag 26, while retaining the particulate (e.g., soot) in the collection bag 26. As such, the collection bag 26 can be removed and emptied and/or replaced with another collection bag 26 (e.g., when it is full of particulate).

The collection bag 26 is provided in (e.g., hangs inside of) a collection basin 28 for spent scrubbing agent. The collection basin receives the spent scrubbing agent. That is, the particulate is retained by the collection bag 26, and the scrubbing agent passing through the screen or mesh of collection bag 26 is "cleaned" of particulate. As such, the scrubbing agent can be recirculated and recycled for reuse. In an example, a pass-through or opening 30 is formed between the collection basin 28 and the supply basin 16, enabling the scrubbing agent to return to the supply basin 16, where the recycled scrubbing agent is pumped via pump 22 into the manifold 23 through the coil 18 and spray nozzles 20.

It is noted that other mechanisms (e.g., a pipeline with or without a separate pump) may be provided to move the scrubbing agent from the collection basin 28 to the supply basin 16. In addition, further screening and/or filtration may be provided before returning the scrubbing agent from the collection basin 28 to the supply basin 16, e.g., if the mesh on the collection bag 26 is not sufficient to remove all of the particulate, to prevent clogging of the spray nozzles 20.

In an example, the containment area 12 defines a separate clean zone (e.g., on the left side of the cabinet 13 in FIGS. 3 and 4), and a dirty zone (e.g., on the right side of the cabinet 13 in FIGS. 3 and 4). The clean zone and dirty zone is not limited to left and/or right side of the cabinet 13 (shown by example in FIGS. 3 and 4), but instead are defined as distinct and separate zones within the cabinet 13. The clean zone includes the supply basin 16 providing the scrubbing agent. The clean zone exhausts the air cleaned of the soot out of an air outlet 24 (e.g., to the dust collector 2 or atmosphere). The dirty zone includes the coil 18, collection basin, and collection bag. The dirty zone receives the air containing the soot for cleaning into the containment area 12.

In an example, the containment area 12 defines an upper zone and a lower zone. The upper zone handles the air exchange (air intake and exhaust) and is where the scrubbing agent is sprayed onto the incoming air. The lower zone handles the scrubbing agent, both the supply (e.g., in supply basin 16) and particulate collection and scrubbing agent recycling operations. In an example, the upper zone may be separated from the lower zone by a grated floor (not shown). A grated floor may be provided to collect larger particulates, but is not required. It is noted that the clean zone and dirty zone may extend through both the upper zone and the lower zone.

Figure 5:
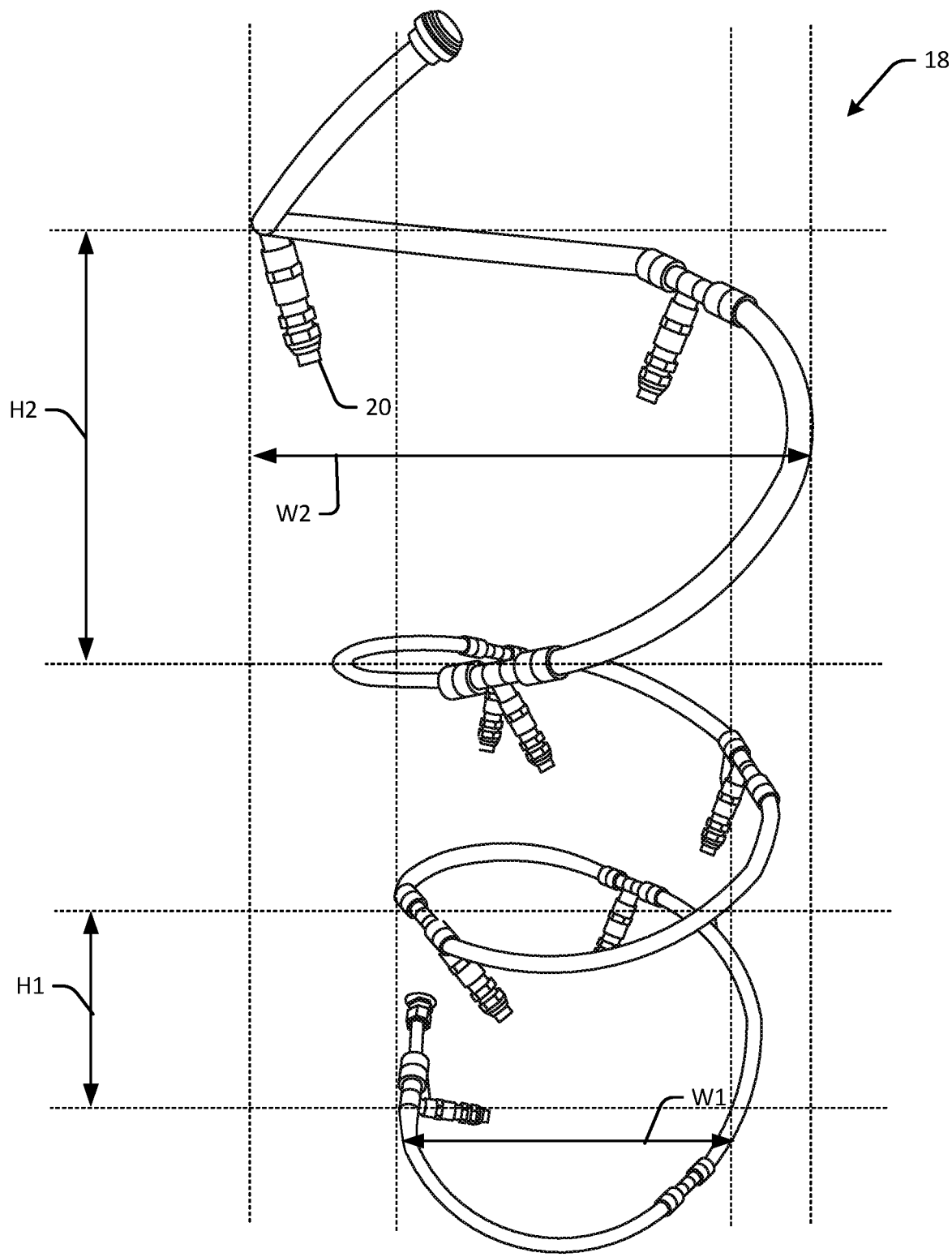
FIG. 5 is a detailed perspective view of an example coil which may be implemented with the example airborne particulate suppression system.

FIG. 5 is a detailed perspective view of an example coil which may be implemented with the example airborne particulate suppression system 10. In an example, the coil 18 has a plurality of windings formed between a first end (e.g., bottom portion) and a second end (e.g., top portion). In an example, the coil 18 is positioned in the containment area 12 of the airborne particulate suppression system 10 in a substantially vertical orientation. That is, the first end of the coil 18 is positioned directly above a second end of the coil 18.

In an example, the first end of the coil 18 may have one or more coil windings that are larger than one or more coil winding on the second end of the coil 18. For example, the coil 18 may have a first end coil diameter W1 that is larger than a second end coil diameter W2. The coil 18 may have a first end coil spacing H1 that is larger than a second end coil spacing H2. Such a configuration provides more spray and/or a higher concentration of scrubbing agent to the contaminated air (e.g., air entering the containment area 12) as it exits the inlet line where the cleaning agent is most needed. Less spray is provided higher up in the containment area 12 because the rising air has less contaminant that needs to be removed.

Any number of windings may be provided for the coil 18. More than one coil 18 may be provided. These and other design considerations will be readily apparent to those having ordinary skill in the art after becoming familiar with the teachings here.

It is noted that the examples shown and described are provided for purposes of illustration and are not intended to be limiting. Still other examples are also contemplated.

The invention claimed is:

1. An airborne particulate suppression system, comprising:

a containment area;

an air inlet to receive air containing particulates in the containment area;

a supply basin for a scrubbing agent;

a coil having a plurality of spray nozzles to spray the scrubbing agent onto the air containing particulates in the containment area;

a pump to provide the scrubbing agent to the coil at a pumping rate configured to spray the scrubbing agent from the plurality of spray nozzles and onto the air containing particulates in the containment area to remove at least some of the particulates from the air; and an air outlet to exhaust clean air from the containment area.

2. The airborne particulate suppression system of claim 1, further comprising an airflow supply line to provide the air containing the particulates through the air inlet and into the containment area.

3. The airborne particulate suppression system of claim 2, wherein the airflow supply line is provided through at least a portion of the coil.

4. The airborne particulate suppression system of claim 2, wherein the airflow supply line delivers the air containing the particulates in a downward direction.

5. The airborne particulate suppression system of claim 1, further comprising a manifold connected between the pump and the coil to distribute flow of the scrubbing agent.

6. The airborne particulate suppression system of claim 1, further comprising a collection bag under the coil, the collection bag configured to capture scrubbing agent containing the particulates after the scrubbing agent is sprayed from the spray nozzles of the coil.

7. The airborne particulate suppression system of claim 6, wherein the collection bag is mesh to pass the scrubbing agent out of the collection bag and retain the particulates in the collection bag.

8. The airborne particulate suppression system of claim 1, further comprising a collection basin for spent scrubbing agent.

9. The airborne particulate suppression system of claim 8, further comprising a pass-through formed between the collection basin and the supply basin for recycling the scrubbing agent.

10. The airborne particulate suppression system of claim 1, wherein the coil has a first end coil winding that is larger than a second end coil winding.

11. The airborne particulate suppression system of claim 1, wherein the coil has a first end coil spacing that is larger than a second end coil spacing.

12. The airborne particulate suppression system of claim 1, wherein the coil has a first end coil that is positioned directly above a second end coil.

13. The airborne particulate suppression system of claim 1, wherein the plurality of spray nozzles are aimed toward a central axis of the coil.

14. The airborne particulate suppression system of claim 1, wherein the scrubbing agent is a liquid.

15. The airborne particulate suppression system of claim 1, wherein the scrubbing agent is a gas.

16. The airborne particulate suppression system of claim 1, wherein the scrubbing agent is a mixture of liquid and gas.

17. The airborne particulate suppression system of claim 1, further comprising:

a clean zone and a dirty zone;

wherein the dirty zone includes the coil, a collection basin, and a collection bag and receives the air containing the particulates for cleaning; and wherein the clean zone includes the supply basin providing the scrubbing agent, and exhausts the air cleaned of the particulates out of the air outlet.

18. An airborne particulate suppression system, comprising:

a housing having an airflow containment area;

a supply basin for a scrubbing agent;

a coil in the containment area, the coil having a plurality of spray nozzles to spray the scrubbing agent into the containment area;

an air inlet configured to deliver air containing airborne particulate into the containment area so that the scrubbing agent is sprayed onto the airborne particulate, wherein the scrubbing agent collects on the airborne particulate and causes the airborne particulate to fall out of the air to clean the air of the airborne particulate;

a collection basin to receive the airborne particulate that falls out of the air; and an air outlet to exhaust air that is at least partially cleaned of the airborne particulate.

19. The airborne particulate suppression system of claim 18, further comprising a return passage from the collection basin to the supply basin for recycling the scrubbing agent.

20. An airborne particulate suppression system, comprising:

a housing having an airflow containment area;

a supply basin for a scrubbing agent;

a coil in the containment area, the coil having a plurality of spray nozzles to spray the scrubbing agent into the containment area;

an air inlet configured to deliver air containing soot into the containment area so that the scrubbing agent is sprayed onto soot, wherein the scrubbing agent causes at least some of the soot to fall out of the air;

a collection basin to receive the soot that falls out of the air;

a return passage from the collection basin to the supply basin for recycling the scrubbing agent; and an air outlet to exhaust air that is at least partially cleaned.

* * * * *